(12) United States Patent
Chen

(10) Patent No.: US 8,079,151 B2
(45) Date of Patent: Dec. 20, 2011

(54) PRUNING SHEARS HAVING ANGLE ADJUSTABLE FUNCTION

(76) Inventor: Chi-Tung Chen, Changhua (TW)

(*) Notice: Subject to any disclaimer, the term of this patent is extended or adjusted under 35 U.S.C. 154(b) by 444 days.

(21) Appl. No.: 12/472,466

(22) Filed: May 27, 2009

(65) Prior Publication Data

US 2010/0299936 A1 Dec. 2, 2010

(51) Int. Cl.
  B26B 27/00 (2006.01)
  B26B 19/00 (2006.01)
  F16C 11/00 (2006.01)
  F16D 3/00 (2006.01)
  A47L 13/00 (2006.01)
  A46B 5/02 (2006.01)

(52) U.S. Cl. ........... 30/296.1; 30/199; 15/144.1; 403/76

(58) Field of Classification Search ................ 30/296.1, 30/244–252, 283, 298, 199, 529, 276; 16/900; 15/144.1, 144.2; 403/9–91, 114–115, 122–123, 403/135, 141, 143
See application file for complete search history.

(56) References Cited

U.S. PATENT DOCUMENTS

| | | | | |
|---|---|---|---|---|
| 2,859,983 A * | 11/1958 | May | ................................ | 285/90 |
| 2,884,655 A * | 5/1959 | Maddox | .................... | 15/144.2 |
| 2,957,297 A * | 10/1960 | Zoetemelk | ...................... | 56/240 |
| 2,994,954 A * | 8/1961 | Thompson | ..................... | 30/231 |
| 3,317,997 A * | 5/1967 | Hedstrom et al. | ............... | 30/248 |
| 3,496,710 A * | 2/1970 | Hedu et al. | ........................ | 56/241 |
| 3,594,903 A * | 7/1971 | Schluchter | ......................... | 30/39 |
| 4,796,325 A * | 1/1989 | Bortman | ...................... | 15/167.2 |
| 4,880,015 A * | 11/1989 | Nierman | ........................ | 600/564 |
| 4,950,273 A * | 8/1990 | Briggs | ............................ | 606/113 |
| 5,317,806 A * | 6/1994 | Held et al. | ........................ | 30/249 |
| 5,653,548 A * | 8/1997 | Amdahl | .......................... | 403/133 |
| 6,182,367 B1 * | 2/2001 | Janczak | ............................ | 30/392 |
| 6,571,479 B1 * | 6/2003 | Wu | .................................. | 30/248 |
| 7,028,699 B2 * | 4/2006 | Lee | ................................ | 135/20.1 |
| 7,370,423 B1 * | 5/2008 | Huang | ............................. | 30/199 |
| 2003/0009840 A1 * | 1/2003 | Karsten | ...................... | 15/230.11 |
| 2003/0061716 A1 * | 4/2003 | Chen | ............................. | 30/296.1 |
| 2005/0241158 A1 * | 11/2005 | Demar et al. | ................... | 30/341 |
| 2008/0087783 A1 * | 4/2008 | Istas et al. | ................ | 248/288.11 |

* cited by examiner

*Primary Examiner* — Ghassem Alie
*Assistant Examiner* — Bharat C Patel
(74) *Attorney, Agent, or Firm* — Alan Kamrath; Kamrath IP Lawfirm, PA

(57) ABSTRACT

A pruning hook includes a handle unit, an adjusting unit mounted on the handle unit and a cutting unit mounted on the adjusting unit. The adjusting unit includes a support member mounted on the handle unit, a fastening member releasably mounted on the support member and an adjusting member having a first end provided with an adjusting ball rotatably mounted between the support member and the fastening member and a second end provided with a locking tube connected with the cutting unit. Thus, the adjusting ball of the adjusting member is rotatable and movable between the support member and the fastening member so as to adjust the angle and position of the cutting unit relative to the handle unit in a spherical and three-dimensional manner.

16 Claims, 6 Drawing Sheets

PRUNING SHEARS HAVING ANGLE ADJUSTABLE FUNCTION

BACKGROUND OF THE INVENTION

1. Field of the Invention

The present invention relates to a gardening tool and, more particularly, to a pruning shears to shear a plant at a higher position.

2. Description of the Related Art

A conventional pruning shears in accordance with the prior art shown in FIG. 6 comprises a shank 40, a cutting unit 50, a threaded rod 62 and a locking knob 60. The shank 40 has an upper end provided with a fixed seat 42, a first toothed portion 422 and a second toothed portion 423. The fixed seat 42 of the shank 40 has an inner portion provided with a shaft hole 421. A pulley 41 is mounted on a side of the shank 40. The cutting unit 50 includes a pivot seat 53 pivotally mounted on the fixed seat 42 of the shank 40, a fixed blade 51 mounted on the pivot seat 53, a movable blade 512 pivotally connected with the fixed blade 51, a drive member 52 connected with the movable blade 512 to drive the movable blade 512 to move relative to the fixed blade 51, an elastic member 521 biased between a side 511 of the fixed blade 51 and the drive member 52, and a drive cord (not shown) passing through the pulley 41 and connected with the drive member 52 to drive the drive member 52. The pivot seat 53 of the cutting unit 50 has an inner portion provided with a pivot hole 533 to receive the fixed seat 42 of the shank 40. The pivot seat 53 of the cutting unit 50 has a first side provided with a first serrated portion 531 engaging the first toothed portion 422 of the shank 40 and a second serrated portion 532 engaging the second toothed portion 423 of the shank 40. The pivot seat 53 of the cutting unit 50 has a second side provided with two spaced positioning pieces 534. The threaded rod 62 has a first end extending through the pivot hole 533 of the pivot seat 53 and the shaft hole 421 of the fixed seat 42 and a second end provided with an enlarged positioning plate 621 positioned between the two positioning pieces 534 of the pivot seat 53. The locking knob 60 is mounted on the fixed seat 42 of the shank 40 and has an inner portion provided with a screw bore 61 screwed onto the threaded rod 62 to clamp the fixed seat 42 of the shank 40 and the pivot seat 53 of the cutting unit 50 between the locking knob 60 and the positioning plate 621 of the threaded rod 62.

In operation, the drive cord is driven by a control handle to move the drive member 52 which drives the movable blade 512 to move relative to the fixed blade 51 so as to perform a cutting action. In adjustment, when the locking knob 60 is rotated relative to the fixed seat 42 of the shank 40 to unscrew the screw bore 61 from the threaded rod 62, the first serrated portion 531 of the pivot seat 53 disengages the first toothed portion 422 of the shank 40, and the second serrated portion 532 of the pivot seat 53 disengages the second toothed portion 423 of the shank 40, so that the pivot seat 53 is pivoted relative to the fixed seat 42 so as to adjust the angle of the cutting unit 50. However, the pivot seat 53 is pivoted relative to the fixed seat 42 in a straight direction so that the angle of the cutting unit 50 is adjusted in a one-dimensional manner, thereby limiting the cutting direction of the cutting unit 50.

BRIEF SUMMARY OF THE INVENTION

In accordance with the present invention, there is provided a pruning shears, comprising a handle unit, an adjusting unit mounted on the handle unit and a cutting unit mounted on the adjusting unit. The adjusting unit includes a support member mounted on the handle unit, a fastening member releasably mounted on the support member and an adjusting member having a first end provided with an adjusting ball rotatably mounted between the support member and the fastening member and a second end provided with a locking tube protruding outwardly from the fastening member and connected with the cutting unit.

The primary objective of the present invention is to provide a pruning shears having a three-dimensional angle adjustable function.

Another objective of the present invention is to provide a pruning shears whose angle adjustment is achieved in a spherically arranged manner.

A further objective of the present invention is to provide a pruning shears, wherein the adjusting ball of the adjusting member is rotatable and movable between the support member and the fastening member to change the angle between the connecting tube and the extension pipe in a spherically adjusting manner so as to adjust the angle and position of the cutting unit relative to the handle unit in a three-dimensional manner, thereby facilitating a user operating the cutting unit.

A further objective of the present invention is to provide a pruning shears, wherein the connecting tube of the cutting unit is located between the fixed blade and the adjusting unit to increase the distance between the fixed blade and the adjusting unit so as to enhance the bending action of the cutting unit so that the cutting unit is available for different cutting conditions.

Further benefits and advantages of the present invention will become apparent after a careful reading of the detailed description with appropriate reference to the accompanying drawings.

BRIEF DESCRIPTION OF THE SEVERAL VIEWS OF THE DRAWING(S)

DETAILED DESCRIPTION OF THE INVENTION

Figure 1:
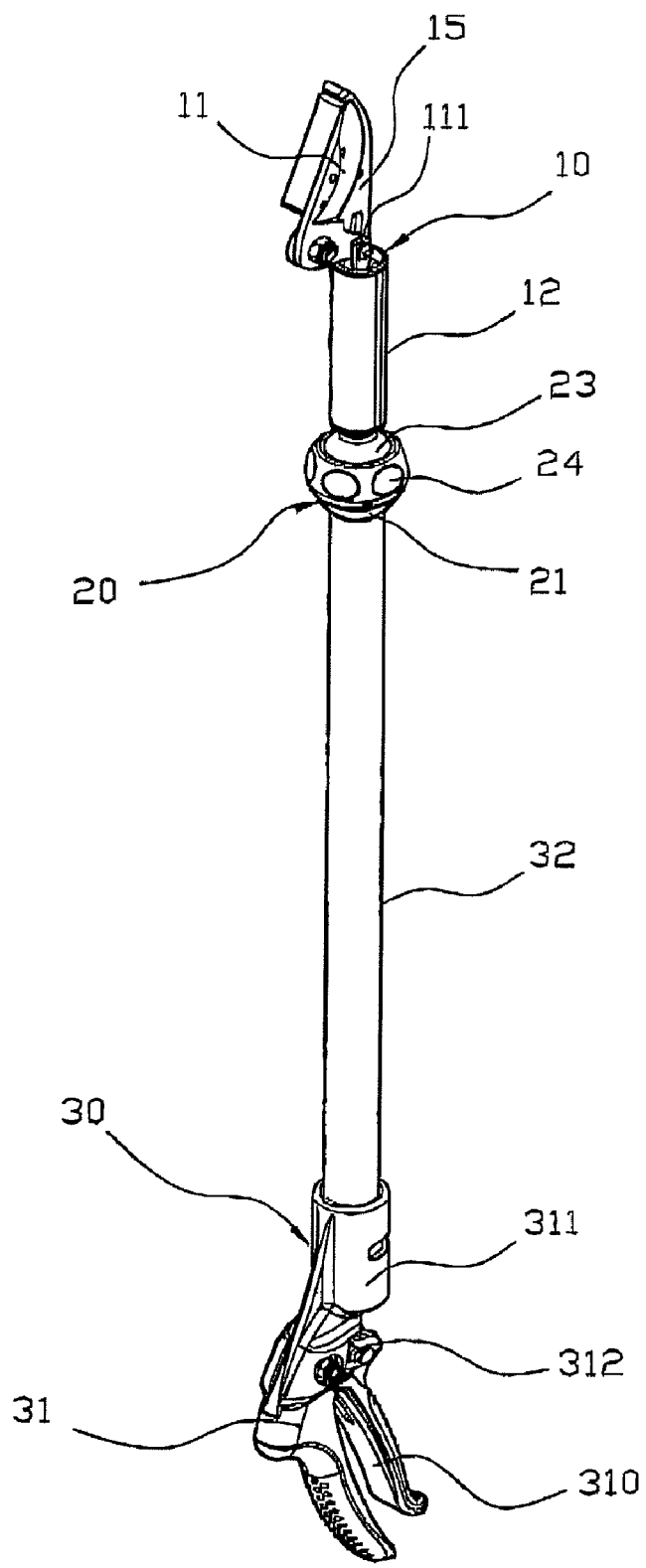
FIG. 1 is a perspective view of a pruning shears in accordance with the preferred embodiment of the present invention.
Figure 2:
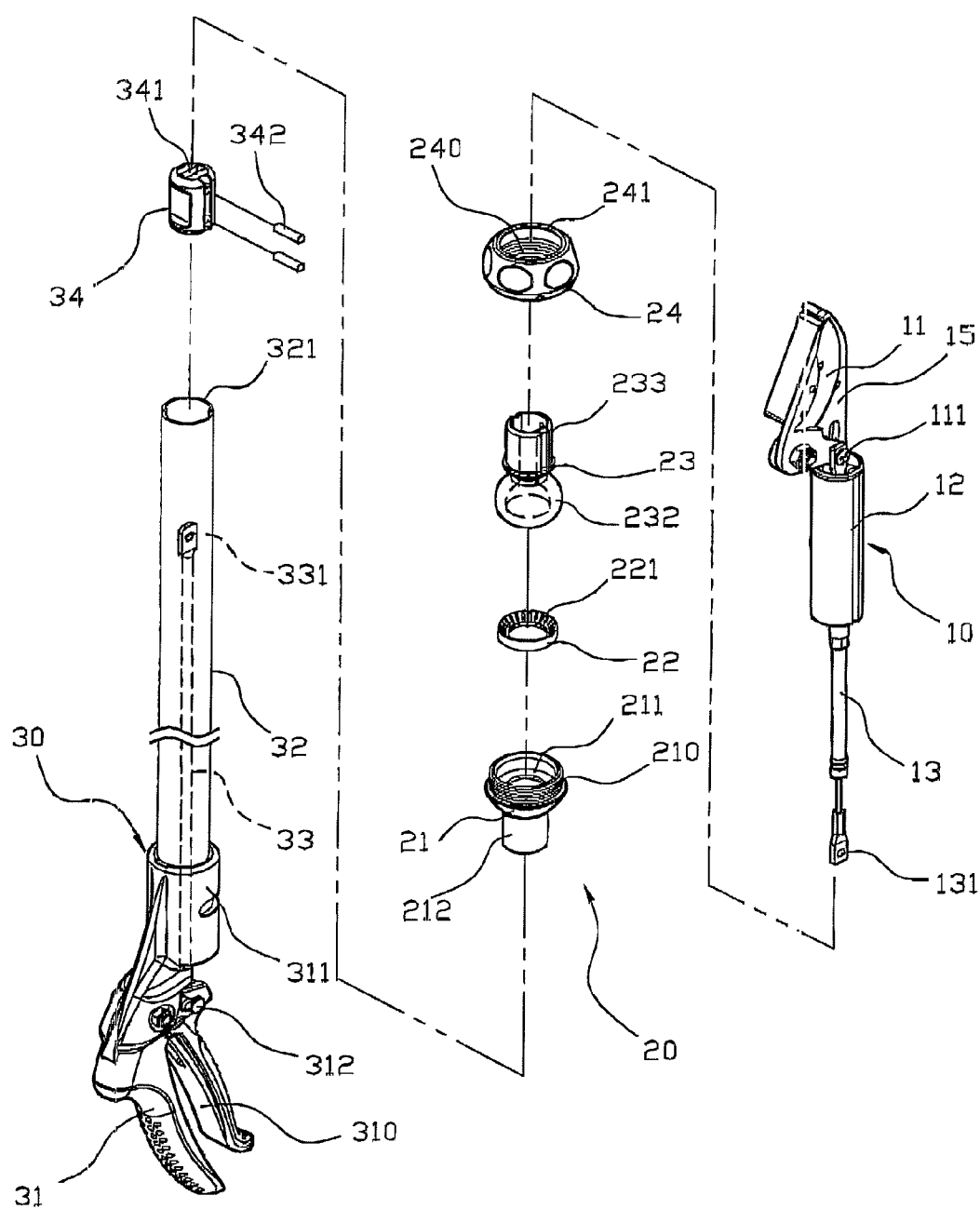
FIG. 2 is an exploded perspective view of the pruning shears as shown in FIG. 1.
Figure 3:
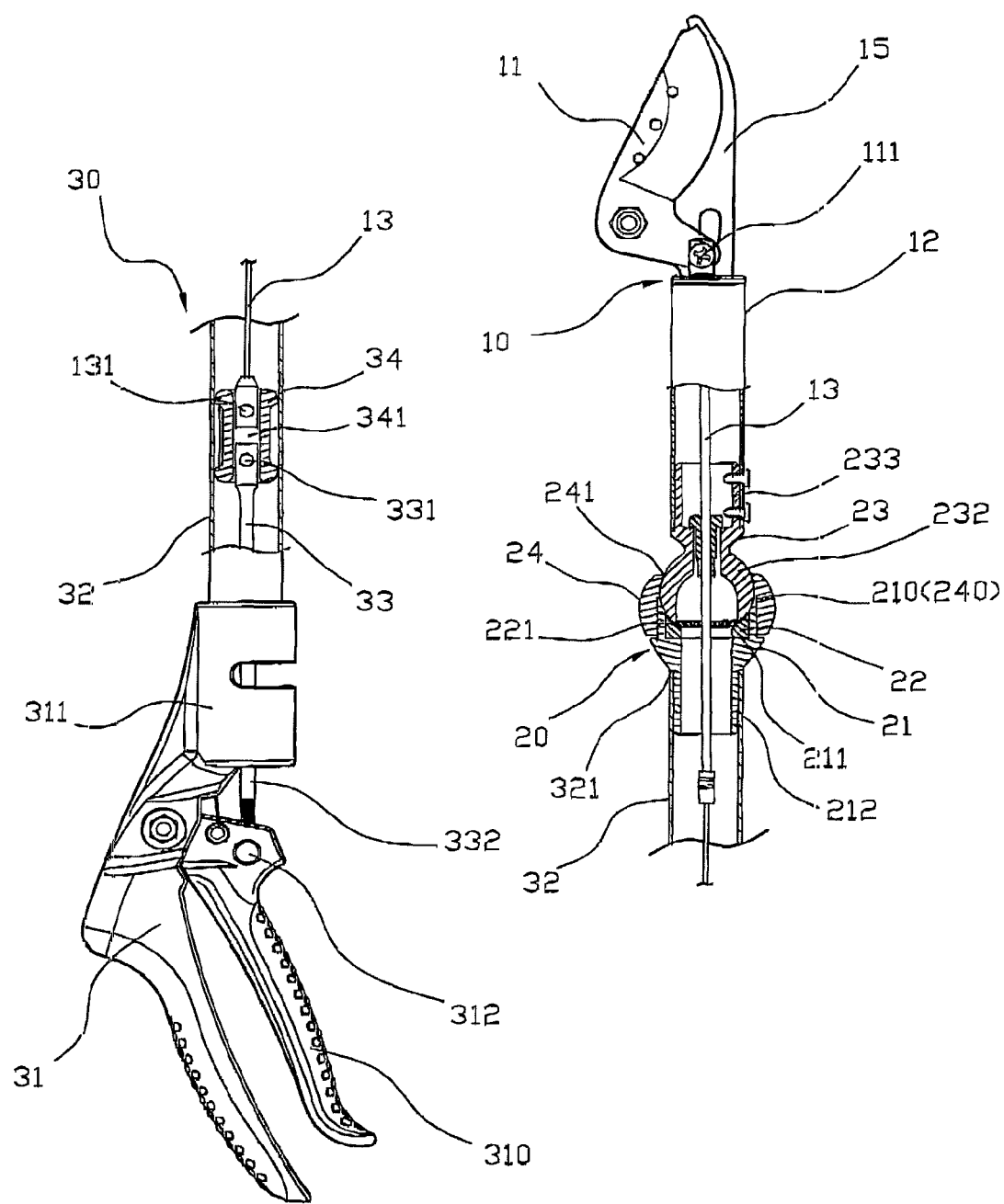
FIG. 3 is a front cross-sectional view of the pruning shears as shown in FIG. 1.

Referring to the drawings and initially to FIGS. 1-3, a pruning shears in accordance with the preferred embodiment of the present invention comprises a handle unit 30, an adjusting unit 20 mounted on the handle unit 30 and a cutting unit 10 mounted on the adjusting unit 20.

The adjusting unit 20 includes a support member 21 mounted on the handle unit 30, a fastening member 24 releasably mounted on the support member 21, an adjusting member 23 having a first end provided with an adjusting ball 232 rotatably mounted between the support member 21 and the fastening member 24 and a second end provided with a locking tube 233 protruding outwardly from the fastening member 24 and connected with the cutting unit 10, and a damping pad 22 mounted in the support member 21 and abutting the adjusting ball 232 of the adjusting member 23 to provide a friction to the adjusting ball 232 of the adjusting member 23.

The support member 21 of the adjusting unit 20 has an inner portion provided with a receiving recess 211 to partially receive the adjusting ball 232 of the adjusting member 23. The support member 21 of the adjusting unit 20 has a first end provided with an outer thread 210 and a second end provided with a reduced plug 212. The damping pad 22 of the adjusting unit 20 is received in the receiving recess 211 of the support member 21. The damping pad 22 of the adjusting unit 20 has an annular shape and has a peripheral wall provided with an arcuate serrated resting face 221 abutting the adjusting ball 232 of the adjusting member 23. The fastening member 24 of the adjusting unit 20 has a first end provided with an inner thread 240 screwed onto the outer thread 210 of the support member 21 and a second end provided with a pressing opening 241 pressing the adjusting ball 232 of the adjusting member 23 to locate the adjusting ball 232 of the adjusting member 23 between the support member 21 and the fastening member 24. The adjusting ball 232 of the adjusting member 23 is partially located between the receiving recess 211 of the support member 21 and the pressing opening 241 of the fastening member 24 and partially protrudes outwardly from the pressing opening 241 of the fastening member 24.

The cutting unit 10 includes a connecting tube 12 having a first end mounted on the locking tube 233 of the adjusting member 23, a fixed blade 15 mounted on a second end of the connecting tube 12, a movable blade 11 pivotally connected with the fixed blade 15, and a connecting rod 13 having a first end pivotally connected with the movable blade 11 to drive the movable blade 11 to move relative to the fixed blade 15.

The connecting tube 12 of the cutting unit 10 is located between the fixed blade 15 and the adjusting member 23 of the adjusting unit 20. The connecting rod 13 of the cutting unit 10 is movable in the connecting tube 12 and in turn extends through the adjusting member 23, the damping pad 22 and the support member 21 of the adjusting unit 20. The first end of the connecting rod 13 is pivotally connected with the movable blade 11 by a pivot screw 111. The locking tube 233 of the adjusting member 23 is inserted into and locked in the first end of the connecting tube 12.

The handle unit 30 includes an extension pipe 32 having a first end 321 mounted on the support member 21 of the adjusting unit 20, an extension rod 33 having a first end 331 connected with a second end 131 of the connecting rod 13 to drive the connecting rod 13, a fixed handle 31 mounted on a second end of the extension pipe 32, and a movable handle 310 pivotally mounted on the fixed handle 31 and pivotally connected with a second end 332 of the extension rod 33 to drive the extension rod 33.

The extension rod 33 of the handle unit 30 is movable in the extension pipe 32 of the handle unit 30, and the second end 131 of the connecting rod 13 extends into the extension pipe 32 of the handle unit 30. The first end 331 of the extension rod 33 is connected with the second end 131 of the connecting rod 13 by a slide 34 which is movable in the extension pipe 32 of the handle unit 30. The first end 331 of the extension rod 33 and the second end 131 of the connecting rod 13 are secured in the slide 34 by two fixing pins 342. The slide 34 has an inner portion provided with a fixing hole 341 to receive the first end 331 of the extension rod 33 and the second end 131 of the connecting rod 13. The fixed handle 31 of the handle unit 30 has a side provided with a tubular mounting portion 311 mounted on the second end of the extension pipe 32. The movable handle 310 of the handle unit 30 has a side provided with a pull portion 312 pivotally connected with the second end 332 of the extension rod 33. The plug 212 of the support member 21 is inserted into and locked in the first end 321 of the extension pipe 32.

In operation, again referring to FIGS. 1-3, when the movable handle 310 is moved relative to the fixed handle 31, the extension rod 33 is driven by the movable handle 310 to move the connecting rod 13 which drives the movable blade 11 to move relative to the fixed blade 15 so as to perform a cutting action.

Figure 4:
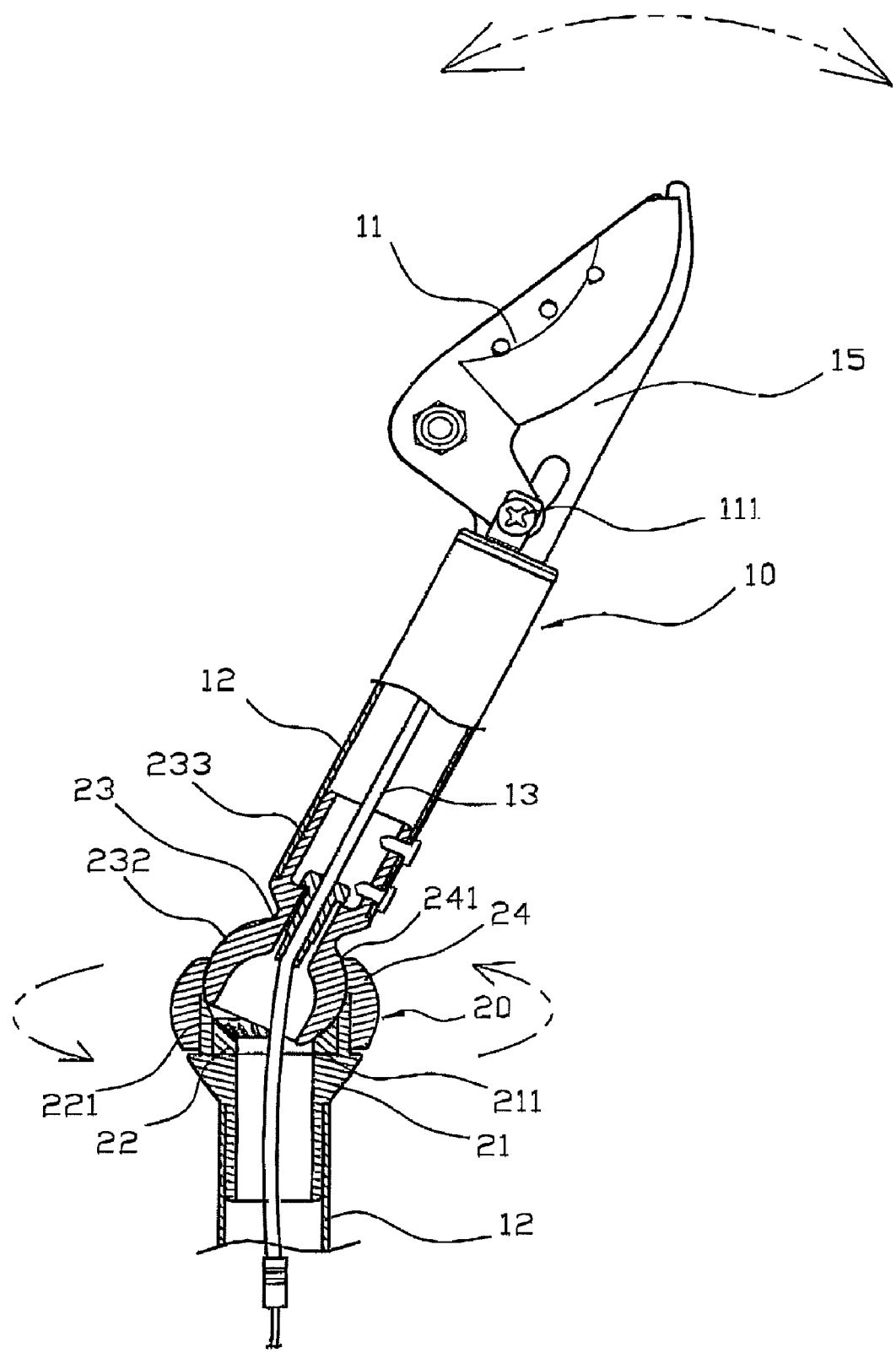
FIG. 4 is a locally enlarged operational view of the pruning shears as shown in FIG. 3.
Figure 5:
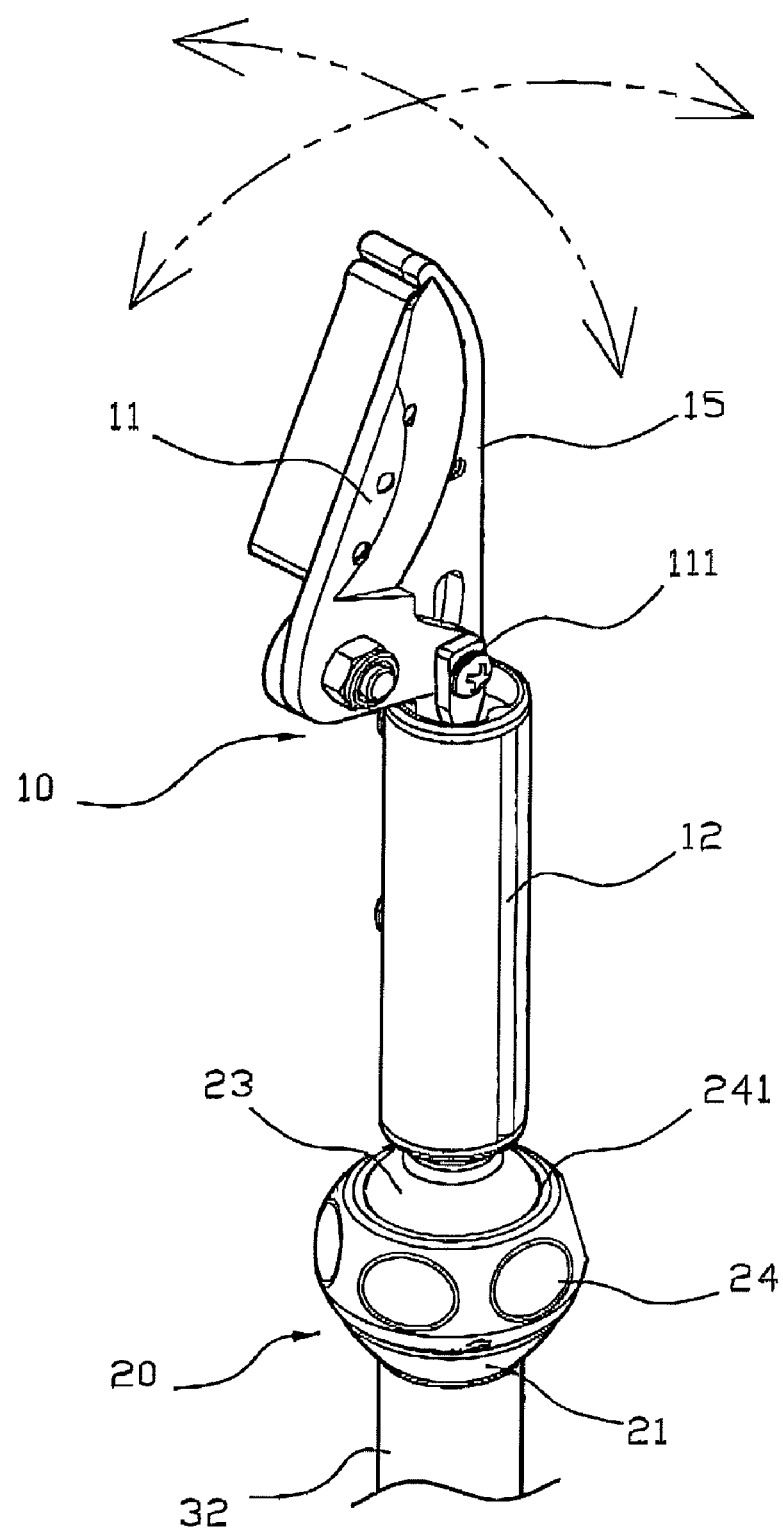
FIG. 5 is a locally enlarged operational view of the pruning shears as shown in FIG. 1.
Figure 6:
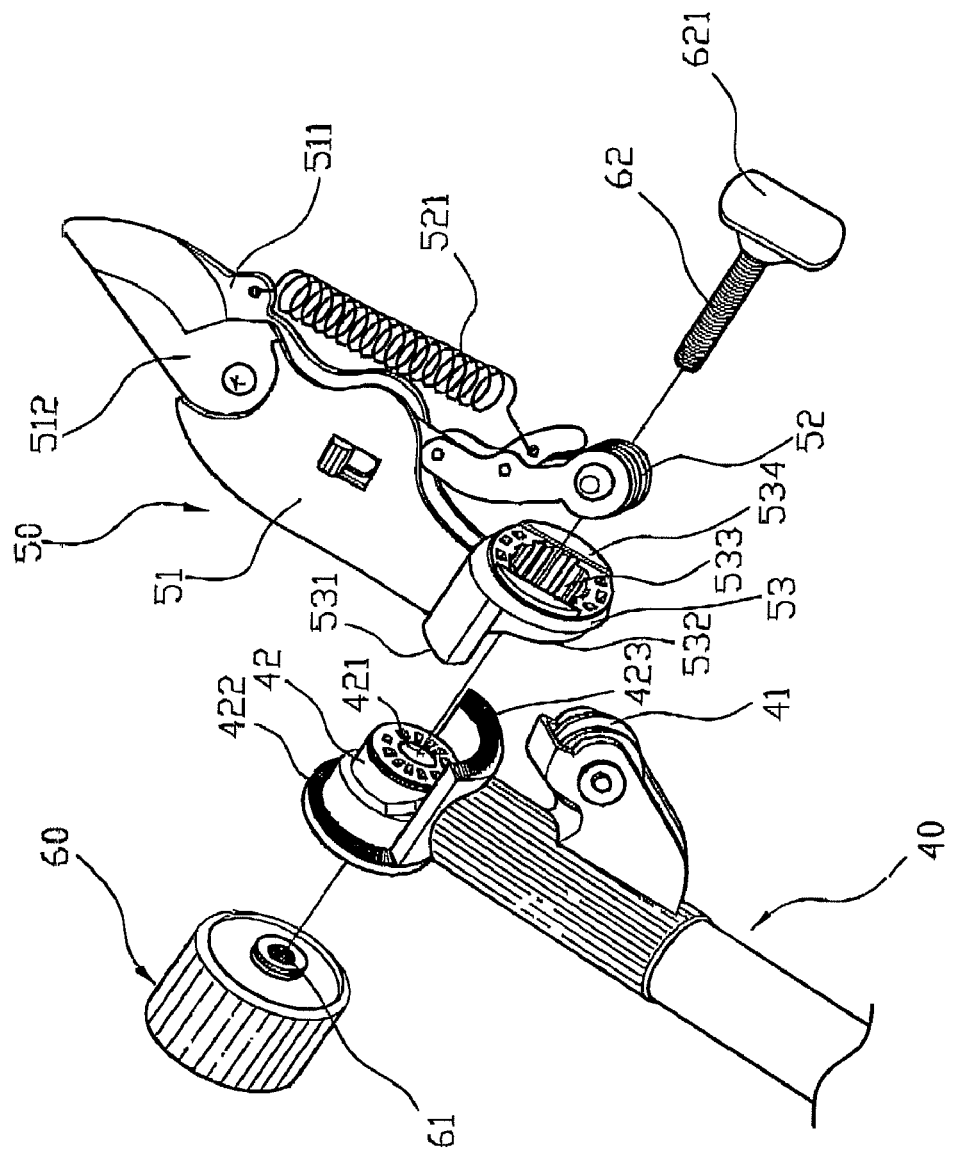
FIG. 6 is an exploded perspective view of a conventional pruning shears in accordance with the prior art.

In adjustment, referring to FIGS. 4 and 5 with reference to FIGS. 1-3, when the fastening member 24 is unscrewed and loosened from the support member 21, the adjusting member 23 is released from the fastening member 24 so that the adjusting ball 232 of the adjusting member 23 is rotatable between the support member 21 and the fastening member 24 to change the angle between the connecting tube 12 and the extension pipe 32 so as to adjust the angle and position of the cutting unit 10 relative to the handle unit 30. After the adjustment is accomplished, the fastening member 24 is screwed onto the support member 21 to press the adjusting ball 232 of the adjusting member 23 so as to lock the adjusting member 23 between the support member 21 and the fastening member 24.

Accordingly, the adjusting ball 232 of the adjusting member 23 is rotatable and movable between the support member 21 and the fastening member 24 to change the angle between the connecting tube 12 and the extension pipe 32 in a spherically adjusting manner so as to adjust the angle and position of the cutting unit 10 relative to the handle unit 30 in a three-dimensional manner, thereby facilitating a user operating the cutting unit 10. In addition, the connecting tube 12 of the cutting unit 10 is located between the fixed blade 15 and the adjusting unit 20 to increase the distance between the fixed blade 15 and the adjusting unit 20 so as to enhance the bending action of the cutting unit 10 so that the cutting unit 10 is available for different cutting conditions.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the true scope of the invention.

The invention claimed is:

1. A pruning shears, comprising:
   a handle unit;
   an adjusting unit mounted on the handle unit;
   a cutting unit mounted on the adjusting unit; wherein:
   the adjusting unit includes:
   a support member mounted on the handle unit;
   a fastening member releasably mounted on the support member;
   an adjusting member having a first end provided with an adjusting ball rotatably mounted between the support member and the fastening member and a second end provided with a locking tube protruding outwardly from the fastening member and connected with the cutting unit;
   wherein the support member of the adjusting unit has an inner portion provided with a receiving recess to partially receive the adjusting ball of the adjusting member;
   wherein the adjusting unit further includes: a damping pad mounted in the support member and abutting the adjusting ball of the adjusting member to provide a friction to the adjusting ball of the adjusting member;
   wherein the damping pad of the adjusting unit has an annular shape; and
   wherein the damping pad of the adjusting unit has a peripheral wall provided with an arcuate serrated resting face abutting the adjusting ball of the adjusting member.

2. The pruning shears of claim 1, wherein
the support member of the adjusting unit has a first end provided with an outer thread;
the fastening member of the adjusting unit has a first end provided with an inner thread screwed onto the outer thread of the support member and a second end provided with a pressing opening pressing the adjusting ball of the adjusting member to locate the adjusting ball of the adjusting member between the support member and the fastening member.

3. The pruning shears of claim 2, wherein the adjusting ball of the adjusting member is partially located between the receiving recess of the support member and the pressing opening of the fastening member and partially protrudes outwardly from the pressing opening of the fastening member.

4. The pruning shears of claim 1, wherein the damping pad of the adjusting unit is received in the receiving recess of the support member.

5. The pruning shears of claim 2, wherein the cutting unit includes:
a connecting tube having a first end mounted on the locking tube of the adjusting member;
a fixed blade mounted on a second end of the connecting tube;
a movable blade pivotally connected with the fixed blade;
a connecting rod having a first end pivotally connected with the movable blade to drive the movable blade to move relative to the fixed blade.

6. The pruning shears of claim 5, wherein the handle unit includes:
an extension pipe having a first end mounted on the support member of the adjusting unit;
an extension rod having a first end connected with a second end of the connecting rod to drive the connecting rod;
a fixed handle mounted on a second end of the extension pipe;
a movable handle pivotally mounted on the fixed handle and pivotally connected with a second end of the extension rod to drive the extension rod.

7. The pruning shears of claim 6, wherein the first end of the extension rod is connected with the second end of the connecting rod by a slide.

8. The pruning shears of claim 7, wherein the first end of the extension rod and the second end of the connecting rod are secured in the slide by two fixing pins.

9. The pruning shears of claim 7, wherein
the slide is movable in the extension pipe of the handle unit;
the slide has an inner portion provided with a fixing hole to receive the first end of the extension rod and the second end of the connecting rod.

10. The pruning shears of claim 6, wherein the support member of the adjusting unit has a second end provided with a reduced plug inserted into and locked in the first end of the extension pipe.

11. The pruning shears of claim 5, wherein
the connecting tube of the cutting unit is located between the fixed blade and the adjusting member of the adjusting unit;
the locking tube of the adjusting member is inserted into and locked in the first end of the connecting tube.

12. The pruning shears of claim 5, wherein the connecting rod of the cutting unit is movable in the connecting tube and in turn extends through the adjusting member, the damping pad and the support member of the adjusting unit.

13. The pruning shears of claim 5, wherein the first end of the connecting rod is pivotally connected with the movable blade by a pivot screw.

14. The pruning shears of claim 6, wherein
the extension rod of the handle unit is movable in the extension pipe of the handle unit;
the second end of the connecting rod extends into the extension pipe of the handle unit.

15. The pruning shears of claim 6, wherein the fixed handle of the handle unit has a side provided with a tubular mounting portion mounted on the second end of the extension pipe.

16. The pruning shears of claim 6, wherein the movable handle of the handle unit has a side provided with a pull portion pivotally connected with the second end of the extension rod.

* * * * *